United States Patent [19]

Silvestri, Jr.

[11] Patent Number: 4,673,426

[45] Date of Patent: Jun. 16, 1987

[54] MOISTURE PRE-SEPARATOR FOR A STEAM TURBINE EXHAUST

[75] Inventor: George J. Silvestri, Jr., Winter Park, Fla.

[73] Assignee: Westinghouse Electric Corp., Pittsburgh, Pa.

[21] Appl. No.: 829,743

[22] Filed: Feb. 14, 1986

[51] Int. Cl.⁴ .............................................. B01D 45/12
[52] U.S. Cl. ........................................ 55/457; 55/458;
    55/466; 60/685; 122/488; 122/492
[58] Field of Search ................... 55/345, 452, 451, 461,
    55/466, 458; 60/685; 122/34, 488, 492

[56] References Cited

U.S. PATENT DOCUMENTS 4,602,925  7/1986  Huffman ............................ 55/457

*Primary Examiner*—Charles Hart
*Attorney, Agent, or Firm*—R. S. Lombard

[57] ABSTRACT

A moisture pre-separator for the exhaust portion of a high pressure steam turbine is disclosed. The pre-separator mounts in the nozzle and adjoining piping of the exhaust portion and provides a first channel for capturing moisture caused by secondary flow and a second channel for capturing moisture flowing on the exhaust hood wall. Drains are provided for both channels.

5 Claims, 8 Drawing Figures

MOISTURE PRE-SEPARATOR FOR A STEAM TURBINE EXHAUST

CROSS-REFERENCE TO RELATED APPLICATION

Reference is hereby made to copending U.S. application Ser. No. 6/696,221 filed Jan. 29, 1985, by the present inventor and others and issued to the present assignee which discloses an alternative moisture separating device for the exhaust portion of a high pressure steam turbine.

BACKGROUND OF THE INVENTION

This invention relates to steam turbines and more particularly to means for diminishing exhaust pipe erosion in steam turbines. Moisture leaving the exhaust system of a steam turbine, typical of a high pressure steam turbine used in nuclear plants, may cause erosion of the crossunderpiping which connects the turbine exhaust hood and the moisture separator reheater. Exhaust pipes which connect the high pressure turbine with the moisture separator reheater in a nuclear power plant are subject to serious erosion damage.

There have been a number of patents in recent years dealing with this problem. One such patent issued to Moen et al., U.S. Pat. No. 3,902,876 dated Sept. 2, 1975 discloses a centrifugal-type gas-liquid separator for use in a pressure vessel of a nuclear reactor steam generator. Centrifugal-type separators rely on creating a swirling motion to the fluid such that the water forms an outer layer on the walls of the separator and then is drained off.

U.S. Pat. No. 4,527,396 by the present inventor and issued to the present assignee dated July 9, 1985 discloses a moisture separtor mounted in an exhaust pipe of a steam turbine.

U.S Pat. No. 3,320,729 issued to W. F. Stahl dated May 23, 1967 discloses an apparatus for removing liquid from a liquid laden gas stream.

SUMMARY OF THE INVENTION

The present invention provides a moisture pre-separator for an exhaust portion of a steam turbine. The exhaust portion of a steam turbine typically includes an exhaust hood. The exhaust hood encloses an exhaust hood chamber. The exhaust hood includes wall means having exhaust nozzle means passing therethrough. Piping means are affixed to the nozzle means.

The moisture pre-separator of the present invention comprises a first inner hollow member having an inlet end extending into the exhaust hood chamber and an outlet end having a final diameter equal to the inside diameter of the piping means. The first inner hollow member is affixed to the piping means at the outlet end thereof to form a jointure in sealing relationship therewith.

A second hollow inner member is disposed concentrically around the first hollow inner member. The second hollow inner member is affixed at one end to the inlet end of the first hollow inner member. The second hollow inner member is affixed at the other end to the piping means.

First channel means is formed between the inner surface of the second hollow member, the inner surface of the piping means and the outer surface of the first hollow member. Second channel means is formed between the outer surface of the second hollow member and the inner surface of the wall means. First drain means is in fluid communication with the first channel means for draining the first channel means. Second drain means is in fluid communication with the second channel means for draining the second channel means.

The first inner hollow member having aperture means therethrough in predetermined position proximate the inlet end, whereby a substantial portion of the water flowing on the walls of the exhaust hood is captured by the second channel and drained by the second drain means and the first inner hollow member constricts the flow of the fluid containing steam with entrained moisture causing a substantial portion of the moisture to flow on the inner surface of the first hollow member which is caused to pass through the apertures and is captured by the first channel means and drained by the first drain means.

Preferably the second channel means has section means therein affixed between the outer surface of the first hollow member and the inner surface of the second hollow member at predetermined intervals forming a plurality of sub-channels. Preferably the first drain means is in fluid communication with each of the sub-channels. Desirably the first hollow member includes a secondary flow forming section proximate the inlet and which may be a curved wall portion. Preferably the apertures pass through the curved wall portion.

BRIEF DESCRIPTION OF THE DRAWINGS

For a better understanding of the invention reference may be had to the accompanying drawings, in which.

DESCRIPTION OF THE PREFERRED EMBODIMENTS

Figure 1:
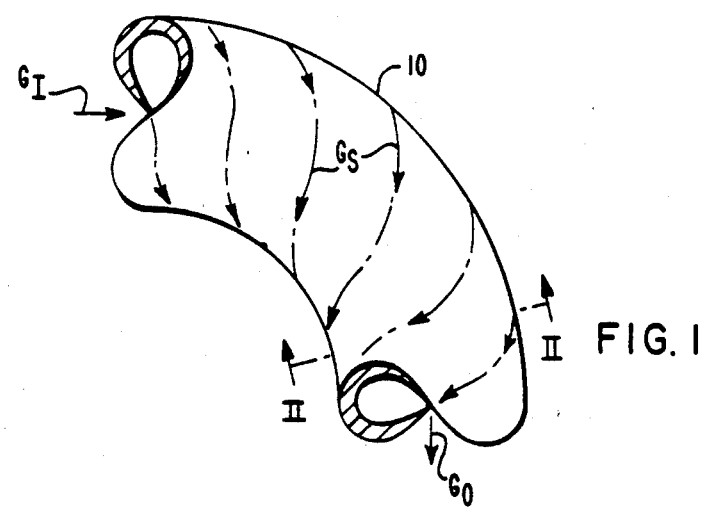
FIG. 1 shows an exemplary pipe bend and the stream lines of a flow of fluid therethrough.

The present invention provides a moisture pre-separator for an exhaust system of a steam turbine. As a gas stream passes through a bend in a pipe, it exhibits a flow which follows a path that is not parallel with the center line of the pipe. FIG. 1 illustrates a pipe bend 10 through which a flow of gas is passing. As a gas, such as steam, approaches a pipe bend, as illustrated by arrows $G_I$, it is generally parallel to the center line of the pipe. However, as the gas flows around the bend of the pipe 10, it changes direction and begins to exhibit a spiral flow. As indicated by arrows $G_S$ after leaving the bend region of the pipe, the gas stream eventually returns to a path which is generally parallel to the center line of the pipe. It should be understood, however, that this normalization of flow of the gas leaving the pipe bend as illustrated by arrows $G_O$, does not immediately take place as it leaves the pipe bend. Instead, the flow of gas retains its spiral shape for distance after it leaves the region of the pipe bend. The specific distance along with the gas stream retains its spiral flow is the function of the gas velocity, pipe size, radius of the pipe bend and other physical characteristics and conditions.

Figure 2:
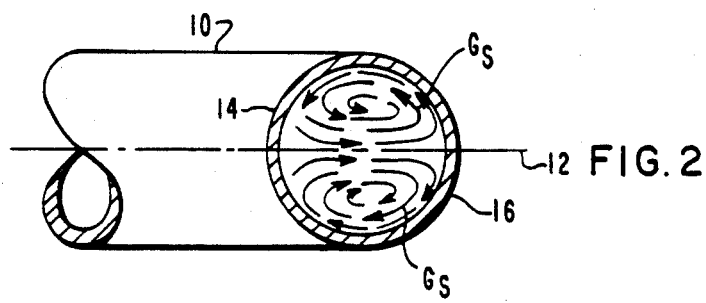
FIG. 2 is a sectional view of the pipe bend of FIG. 1.

FIG. 2 is a section view of the pipe bend 10 illustrated in FIG. 1. In FIG. 2, the twin spirals indicated by arrows $G_S$ can be seen flowing on opposite sides of a center line 12 of the pipe bend 10 which is generally parallel to the plan of the bend. As can be seen in FIG. 2, this spiral flow proceeds along the wall of the pipe as it passes toward the inside 14 of the bend and it then passes along the centerline 12 of the pipe as it proceeds towards the outside 16 of the bend.

Figure 3:
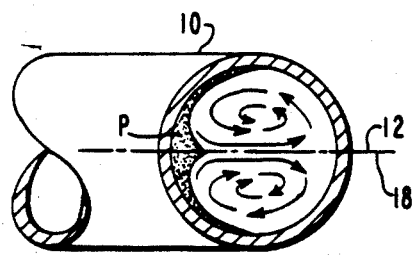
FIGS. 3, 4 and 5 illustrate the typical behavior of a liquid within a gas stream flowing through a pipe bend under various conditions.
Figure 4:
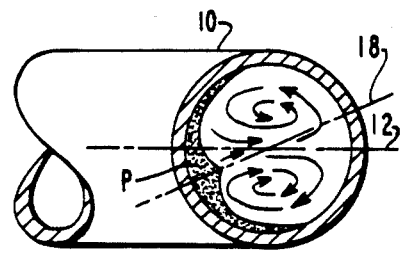
Figure 5:
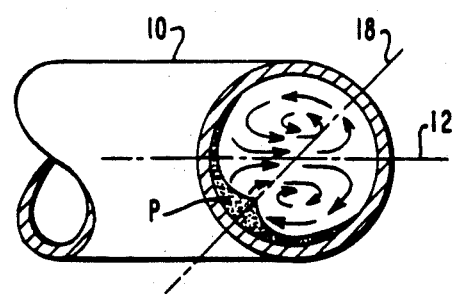

FIGS. 3, 4 and 5 illustrate the affect that the twin spiral flow has on a liquid which is entrained within the gas stream. It should be apparent that the twin spirals will tend to cause a liquid to move along the walls of the pipe as it passes through a pipe bend and eventually meet at a stagnation point P where the two spirals are causing liquid to move in opposing directions toward each other. In FIGS. 3, 4 and 5, this stagnation point P is shown at various positions along the wall of the pipe which are determined by the relative magnitudes of the gas velocity and the acceleration of gravity. For example, FIG. 3 illustrates the circumstance for the gases moving through the pipe at a velocity of approximately 300 ft/sec and with a Froude number of approximately 17,000. The stagnation point P, where the water collects against the wall of the pipe, lies essentially on the pipe's center line 12 which lies within the plane of the bend. A center line 18 which passes through the center of the pipe and the stagnation point P is therefore essentially coincident with the center line 12. FIG. 4 illustrates a condition where the gas is flowing at a lesser rate of speed of approximately 150 ft/sec with a Froude number of approximately 14,250. As can be seen, the stagnation point P in FIG. 4 lies below the center line 12 due to the increased relative affect of gravity as compared to the affect of the gas velocity. Under these conditions center line 12 and center line 18 diverge as the stagnation point P moves away from the extreme inside portion of the bend (reference number 14 in FIG. 2). In FIG. 5, the velocity of the gas is approximately 50 ft/sec with a Froude number of approximately 470. As can be seen, the stagnation point P has moved significantly away from the center line 12 and center line 18 has diverges significantly from the center line 12 due to the increased relative magnitude of gravity as compared to the gas velocity. As can be seen from FIGS. 3, 4 and 5, the twin spirals of flow within a pipe bend 10 cause a stagnation point P to be formed where the moisture which exists in the gas flow can be forced to collect. As is further illustrated by these figures, the exact location location of the stagnation point P can vary within the pipe bend as a function of the gas velocity and the direction of the gravitational force on the fluid relative to the position of the pipe bend. In FIGS. 3, 4 and 5, the pipe bend 10 is illustrated as lying in a horizontal plane with the pipe's center line 12, which is generally parallel to the plane of the bend, being horizontal. It should be apparent that the positioning of the pipe bend in alternative directions relative to the direction of gravitational force will significantly affect the location of the stagnation point in relationship to the twin spirals of gas flow and the inside portion 14 of the pipe bend.

Figure 6:
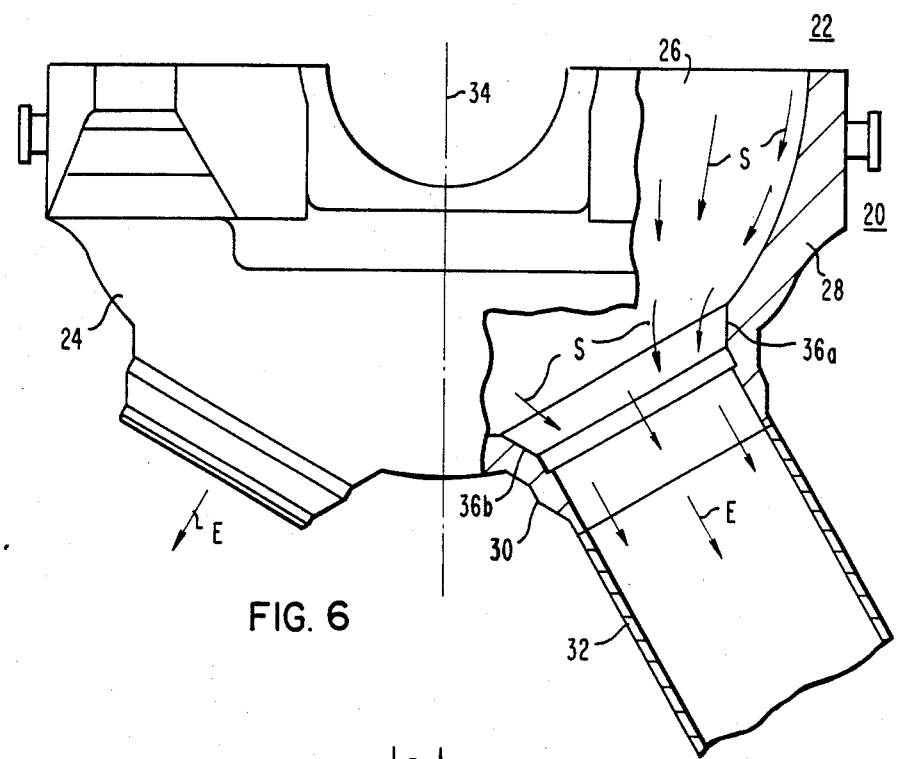
FIG. 6 is an elevational view partly in section of the exhaust portion of the high pressure steam turbine.

FIG. 6 shows a typical exhaust portion 20 of a high pressure steam turbine 22. The exhaust portion 20 includes an exhaust hood 24. The exhaust hood 24 encloses an exhaust hood chamber 26. The exhaust hood 24 includes wall means 28 having exhaust nozzle means 30 passing therethrough. Piping means 32 is affixed to the nozzle means 30. The steam turbine 22 is generally symmetrical about its center line 34. In FIG. 6 the wall 28 is broken away to show a portion of the exhaust hood chamber 26 and the nozzle 30 is shown in section view in order to more clearly illustrate the typical path of high pressure steam as it approaches the exhaust nozzle means 30. A portion of the flow of steam within the steam turbine 22 is illustrated by arrows S. Most of the entering flow follows the outside contour of the wall means 28 as illustrated by arrows S. Because of the placement of the nozzle means 30, and the approaching flow indicated by arrows S, the flow distribution into piping means 32 connected to the nozzle means 30 will be skewed and there will therefore be higher rates of turning or change in direction at some positions within the nozzle means 30 than at others. When a flow of gas is caused to bend, turn, or change its direction, the flow at the inner radius of the bend will have a higher rate of turning than at the outer radius of the bend. The magnitude of secondary flow, which comprises twin spirals as discussed above, varies directly with the rate of turning of the fluid. As can be seen in FIG. 6, there are two regions 36a, 36b, which are analogous to pipe bends where the flow of steam is caused to make a sharper turn than at other regions in the vicinity of the nozzle means 30. The flow of steam around region 36a is especially pronounced because the flow of steam in that particularly region is forced to make a turn which is somewhat sharper than the flow in the region 36b. The reason for this, in the particular exemplary design illustrated in FIG. 6, is that a significant portion of the steam which is passing toward the nozzle means 30 from the center line 34 of the turbine 22 can flow in a relatively straight path across the center line 26, whereas the steam flowing downward pass region 36a is forced to make a more radical turn or change in direction in order to enter the nozzle means 30. It would therefore be expected that the steam flowing around region 36a will develop more significant twin spirals of secondary flow as illustrated in FIGS. 2, 3, 4 and 5. The exact location and direction of the spiral secondary flow will depend on the specific physical configuration of the turbine exhaust nozzle means 30, the velocity of the high pressure steam, the relative affects of gravity and drag, the affects of adjacent flows of steam and various other physical variables. As the steam exits from the nozzles 30, it continue the spiral secondary flow as it passes in the general direction illustrated by arrows E through the exhaust piping toward the moisture separator reheater. It has been found that besides the secondary flow described above, water builds up on the inner surface 38 of the wall means 28 as shown in FIG. 7.

Figure 8:
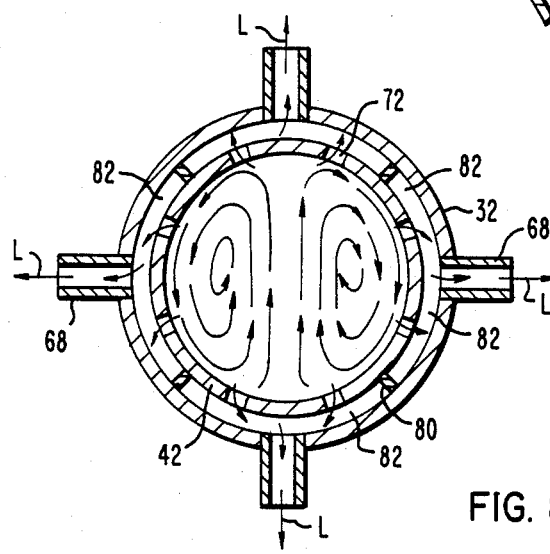
FIG. 8 shows the flow of fluid within a cross section taken along the line A—A of FIG. 7.
Figure 7:
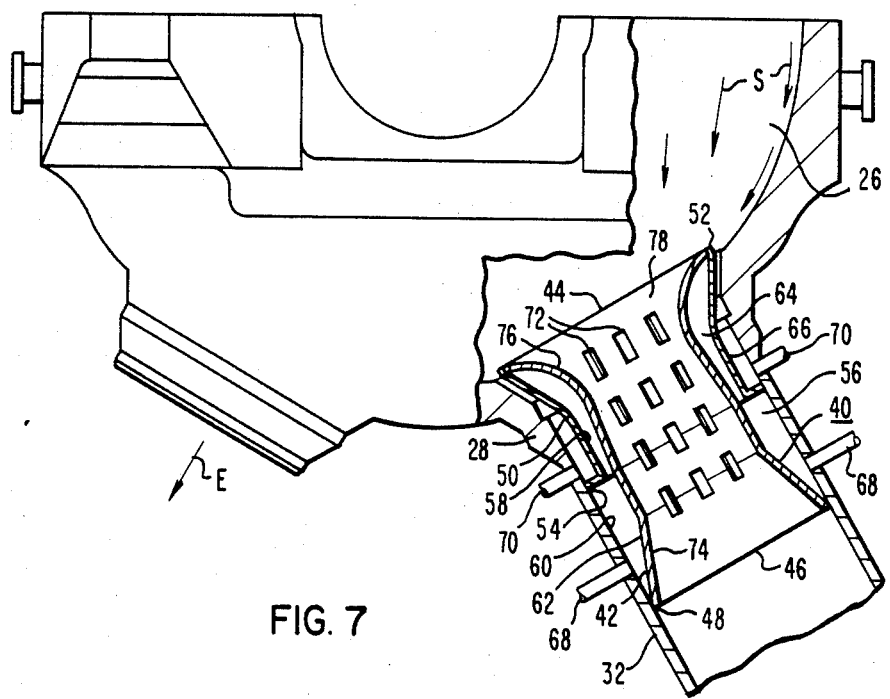
FIG. 7 is an elevational view partly in section of the exhaust portion of the high pressure steam turbine showing the present invention in position within the nozzle and associated piping.

With reference to FIGS. 7 and 8 the present invention provides a moisture pre-separator 40. The moisture pre-separator 40 comprises a first inner hollow member 42 having an inlet end 44 extending into the exhaust hood chamber 26 and an outlet end 46 having a final diameter equal to the inside diameter of the piping means 32. The first inner hollow member 42 is affixed to the piping means 32 at the outlet end 46 thereof to form a jointure 48 in sealing relationship with the piping means 32. A second hollow inner member 50 is disposed concentrically around the first hollow inner member 42 as shown in FIG. 7. The second hollow inner member 50 is affixed at one end 52 thereof to the inlet end 44 of the first hollow inner member 42 and affixed at the other end 54 thereof to the piping means 32. A first channel means 56 is formed between the inner surface 58 of the second hollow member 50, the inner surface 60 of the piping means 32 and the outer surface 62 of the first hollow member 42. A second channel means 64 is formed between the outer surface 66 of the second hollow member 50 and the inner surface 60 of the wall means 28. A first drain means 68 is fluid communication with the first channel means 56 for draining the first channel means. A second drain means 70 is in fluid communication with the second channel means 64 for draining the second channel.

The first hollow member 42 has aperture means 72 therethrough in predetermined position as shown in FIG. 7 proximate the inlet end 44 of the first hollow member 42. With the present invention water flowing on the walls 28 of the exhaust hood 26 is captured by the second channel means 64 and drained by the second drain means 70. The first inner hollow member 42 constricts the flow of fluid containing steam with entrained moisture causing water to form on the inner surface 74 of the first hollow member 42. The water forming on the inner surface 74 is a result of the secondary flow as explained previously. The water forming on the inner surface of the first hollow member passes through the apertures and is captured by the first channel 42 and drained by the first drain 68. Preferably the first hollow member 42 includes a secondary flow forming section 76 proximate the inlet end 44 of the first hollow member. The secondary flow forming section 76 may be a curved wall portion 78 of the first hollow member as shown in FIG. 7. The curved wall portion shown in FIG. 7 has a radius that is a trade off between pressure losses and moisture removal effectiveness. The apertures 72 desirably begin in the curved wall portion 78. The secondary flow forming section causes a high rate of turning which increases the magnitude of secondary flow which together with the apertures provided in the first inner hollow member provides significant moisture retrieval from the secondary flow.

Preferably the first channel means 56 includes section means 80 therein affixed between the outer surface 62 of the first hollow member and the inner surface 58 of the second hollow member at predetermined intervals forming a plurality of sub-channels 82 as shown in FIG. 8. The arrows indicate the direction of fluid flow. A first drain means 68 is in fluid communication with each of the subchannels 82. The inclusion of the section means 80 is desirable to avoid degradation in pre-separator performance because of circumferential pressure variations.

I claim:

1. A moisture pre-separator for an exhaust portion of a steam turbine, said exhaust portion including an exhaust hood, said exhaust hood enclosing an exhaust hood chamber, said exhaust hood including wall means having exhaust nozzle means passing therethrough, piping means affixed to said nozzle means, said moisture pre-separator comprising:

(a) a first inner hollow member having an inlet end extending into said exhaust hood chamber, and an outlet end having a final diameter equal to the inside diameter of said piping means, said first inner hollow member affixed to said piping means at the outlet end thereof to form a jointure in sealing relationship said piping means;

(b) a second hollow inner member disposed concentrically around said first hollow inner member, said second hollow inner member affixed at one end to said inlet end of said first hollow inner member, said second hollow inner member affixed at the other end to said piping means;

(c) first channel means formed between the inner surface of said second hollow member, the inner surface of said piping means and the outer surface of said first hollow member;

(d) second channel means formed between the outer surface of said second hollow member and the inner surface of said wall means;

(e) first drain means in fluid communication with said first channel means for draining said first channel means;

(f) second drain means in fluid communication with said second channel means for draining said second channel means;

(g) said first hollow inner member having aperture means therethrough in predetermined position proximate said inlet end, whereby a substantial portion of the water flowing on the walls of said exhaust hood is captured by said second channel means and drained by said second drain means and said first inner hollow member constricts the flow of the fluid containing steam with entrained moisture causing a substantial portion of the entrained water to form on the inner surface of said first hollow member which passes through said apertures and is captured by the first channel means and drained by the first drain means.

2. The moisture pre-separator of claim 1, wherein said first channel means includes section means therein affixed between said outer surface of said first hollow member and the inner surface of said second hollow member at predetermined intervals forming a plurality of subchannels.

3. The moisture pre-separator of claim 1, wherein said first drain means is in fluid communication with each of said subchannels.

4. The moisture pre-separator of claim 1, wherein said first hollow member includes a secondary flow forming section proximate said inlet end.

5. The moisture pre-separator of claim 4, wherein said secondary flow forming section comprises curved wall portion, the moisture pre-separator of claim 5 wherein said aperture means passes through said curved wall portion.

* * * * *